United States Patent [19]

Angell et al.

[11] Patent Number: 5,015,145

[45] Date of Patent: May 14, 1991

[54] AUTOMATED CARGO LOADING SYSTEM

[75] Inventors: Mickey A. Angell, Winston-Salem; Thomas W. Cearley, Clemmons, both of N.C.; James C. Lewis, Albany, Ga.; Arthur R. St. Onge, York; John A. Szysh, Mt. Joy, both of Pa.; Kenneth W. White, Ithaca, N.Y.

[73] Assignee: R. J. Reynolds Tobacco Company, Winston-Salem, N.C.

[21] Appl. No.: 417,766

[22] Filed: Oct. 6, 1989

[51] Int. Cl.$^5$ .............................................. B65G 67/04
[52] U.S. Cl. ..................................... 414/547; 414/391; 414/398; 901/1
[58] Field of Search ........................... 414/389–393, 414/398, 399, 786, 546, 547, 555, 225, 620; 901/1, 7, 16, 17, 18; 198/414, 468.2

[56] References Cited

U.S. PATENT DOCUMENTS

| | | | |
|---|---|---|---|
| 3,100,039 | 8/1963 | Oderman et al. | 198/414 |
| 3,313,429 | 4/1967 | Cole | 414/392 |
| 3,819,068 | 6/1974 | Weir | 414/398 X |
| 3,853,230 | 12/1974 | Schultz | 414/392 X |
| 3,889,442 | 6/1975 | Grahn et al. | 414/412 X |
| 4,105,925 | 8/1978 | Rossel et al. | 901/7 X |
| 4,229,136 | 10/1980 | Panissidi | 901/16 X |
| 4,242,025 | 12/1980 | Thibault | 901/7 X |
| 4,281,955 | 8/1981 | McWilliams | 414/398 |
| 4,692,876 | 9/1987 | Tenma et al. | 901/7 X |
| 4,764,078 | 8/1988 | Neri | 901/1 X |
| 4,787,803 | 11/1988 | van Elten et al. | 414/398 X |
| 4,792,995 | 12/1988 | Harding | 414/398 X |

FOREIGN PATENT DOCUMENTS

| | | | |
|---|---|---|---|
| 129659 | 10/1979 | Japan | 414/398 |
| 157137 | 7/1987 | Japan | 414/398 |
| 2167031 | 5/1986 | United Kingdom | 414/392 |

*Primary Examiner*—David A. Bucci
*Attorney, Agent, or Firm*—Foley & Lardner

[57] ABSTRACT

A method and apparatus for automatically loading a cargo compartment of a vehicle is disclosed that maximizes the utilization of available space within the vehicle by determining an optimum load configuration based on various parameters of the vehicle and the containers to be loaded. A self-propelled robot loader is used to load the cargo compartment based on the determined optimum load configuration. The robot loader automatically withdraws from the cargo compartment as the loading is completed.

4 Claims, 6 Drawing Sheets

AUTOMATED CARGO LOADING SYSTEM

BACKGROUND OF THE INVENTION

The present invention is related to a method and apparatus for automatically loading cargo vehicles. In particular, the present invention is related to a system that selectively retrieves containers from warehouse storage locations, determines an optimum load configuration for the selected containers, and automatically loads the selected containers into a cargo vehicle in accordance with the determined load configuration.

A major factor in product transportation expenses involves inefficient utilization of cargo space and time consuming loading operations of cargo vehicles. In order to reduce transportation expenses, various methods have been proposed for loading vehicles to reduce the amount of manual labor required and to eliminate the use of pallets which are expensive and must be recycled. Efforts to date have generally centered around the concept of preassembling the load outside of the vehicle, and then pushing or sliding the preassembled load into the vehicle.

For example, U.S. Pat. No. 3,169,652 issued to Ewell describes a system wherein a number of cargo segments are loaded by a clamp truck onto a sled. A wheel-equipped movable bulkhead is then used to push the sled into the cargo compartment of the vehicle to be loaded. The sled is utilized to overcome the frictional force of the load sliding on floor of the vehicle. While providing some advantages over pallet loading, the use of a clamp truck to load the sled requires that space be left between each of the cargo segments. In addition, the use of sleds results in the same disadvantage incurred when using pallets, namely, the requirement of recycling or replacing both pallets and sleds.

Other examples of loading systems that employ preassembly of the load may be found in U.S. Pat. Nos. 3,727,370 issued to Lassig and 3,688,926 issued to Stefanelli. Lassig discloses a system wherein the load is preassembled on a tilting frame, and a hydraulic lift is used to tilt the frame along with a cargo container so that the load slides into the container. Stefanelli discloses a cargo-handling system that employs a cargo positioning conveyor located within the vehicle to be loaded.

In all such preassembly systems, however, difficulties may arise in maintaining the integrity of the load configuration as the load is pushed into the cargo compartment of the vehicle. It is therefore desirable and more efficient to load the vehicle directly without requiring the preassembly of the load and the movement of the assembled load into the vehicle.

SUMMARY OF THE INVENTION

The present invention provides a method and apparatus for automatically loading a cargo vehicle and for maximizing the utilization of available space within the vehicle by determining an optimum load configuration based on various parameters of the vehicle and the containers to be loaded.

More specifically, the present invention provides an apparatus including a conveyor system for moving containers into a cargo compartment, a self-propelled robot loader including a receiving station configured to receive containers from the conveyor system and a robot arm that picks up the containers from the receiving station and loads the containers into the cargo compartment, and a control unit to control the operation of the self-propelled robot loader such that the self-propelled robot loader withdraws from the cargo compartment as said containers are loaded.

The control unit determines an optimum load configuration based on selected parameters of the containers and the cargo compartment, and controls the operation of the self-propelled robot loader to load the containers in accordance with the determined optimum load configuration. The selected parameters may include not only the dimensional characteristics of the containers and the cargo compartment, but also the weight of the containers so that the weight of the load may be properly distributed.

BRIEF DESCRIPTION OF THE DRAWINGS

The present invention will be described in more detail in the following detailed description of the preferred embodiments with reference to the drawings in which.

DETAILED DESCRIPTION OF THE PREFERRED EMBODIMENTS

Figure 1:
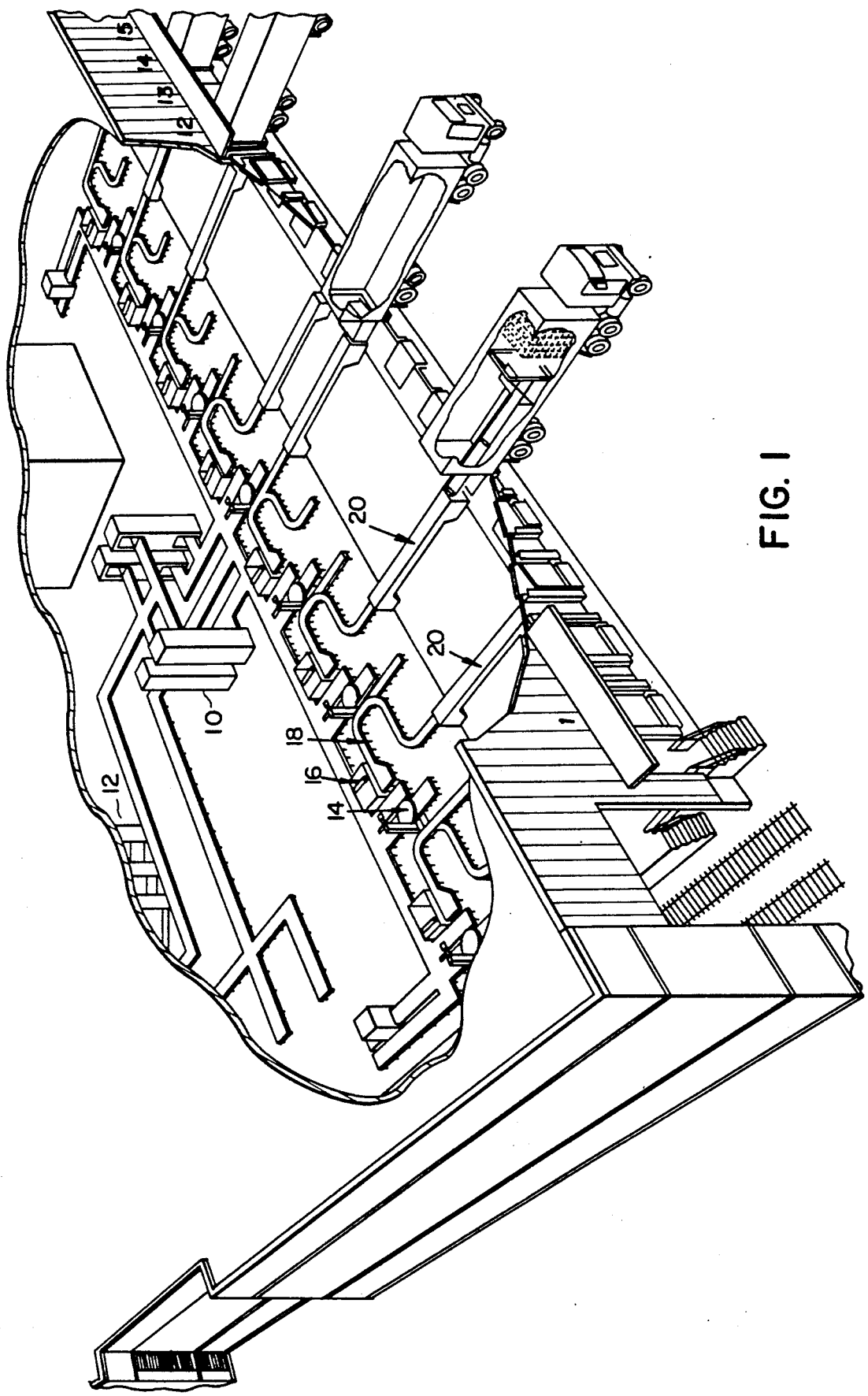
FIG. 1 illustrates an overall system diagram of an automated vehicle loading system according to the present invention.

Referring now to FIG. 1, an automated truck loading system according to the present invention is shown having a conveyor system 10 for receiving pallets and partial pallets from a automated storage area 12, a plurality of stretch wrap removers 14 for removing stretch wrap from pallets received from the conveyor system 10, and a plurality of depalletizers 16 that receive unwrapped pallets from the stretch wrap removers 14 and remove individual containers from the pallets. The containers are distributed via conveyors 18 to a plurality of telescoping conveyors 20 that extend into the cargo compartments of the vehicles to be loaded.

Figure 2:
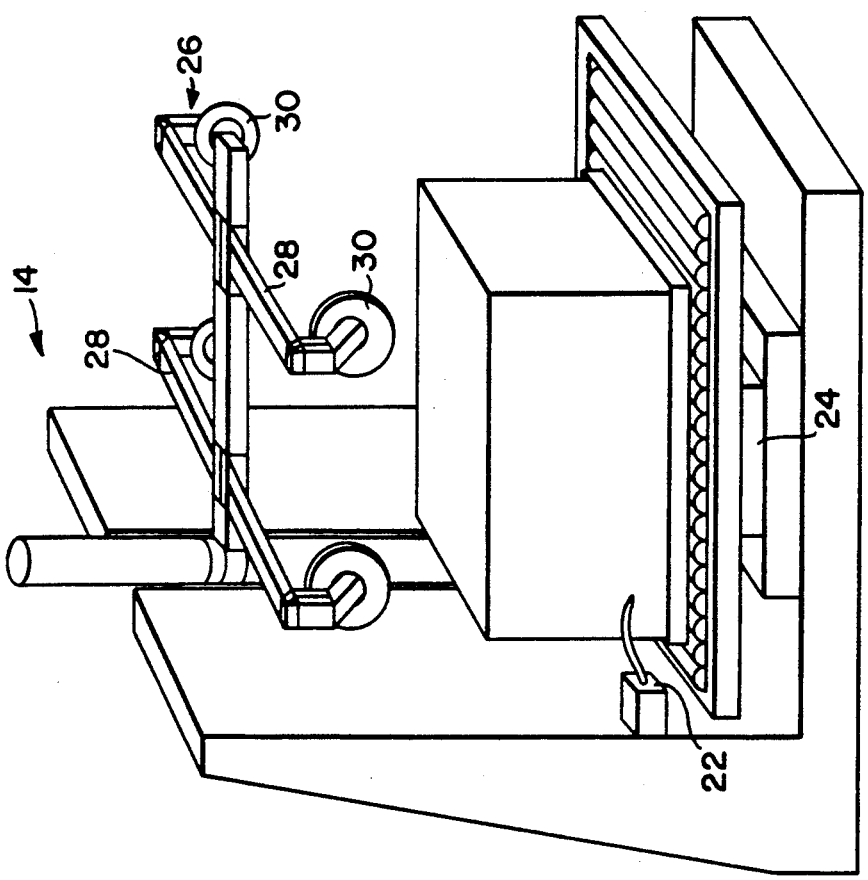
FIG. 2 illustrates a stretch wrap remover employed in the system shown in FIG. 1.

As shown in FIG. 2, the stretch wrap removers 14 employ a flexible heated element 22 to melt open the stretch wrap as the pallet is rotated on a turntable 24. A movable frame assembly 26 is lowered over the pallet once the stretch wrap has been cut. The frame assembly 26 includes several hinged arms 28 to which vacuum gripping units 30 are attached. The arms 28 are activated to bring the gripping units 30 into contact with the stretch wrap and the frame assembly 26 is then lifted to remove the stretch wrap from the pallet. The frame assembly 26 is then rotated and the gripper units 30 deactivated so that the stretch wrap is dropped into a waste container. Alternatively, knives can be used in the stretch wrap removers 14 to cut open the stretch wrap around the pallets as shown in U.S. Pat. Nos. 3,889,442 and 4,390,313. The heated element 22, however, is advantageous as it doesn't require as much maintenance as knives which become dull and must be replaced.

Figure 3:
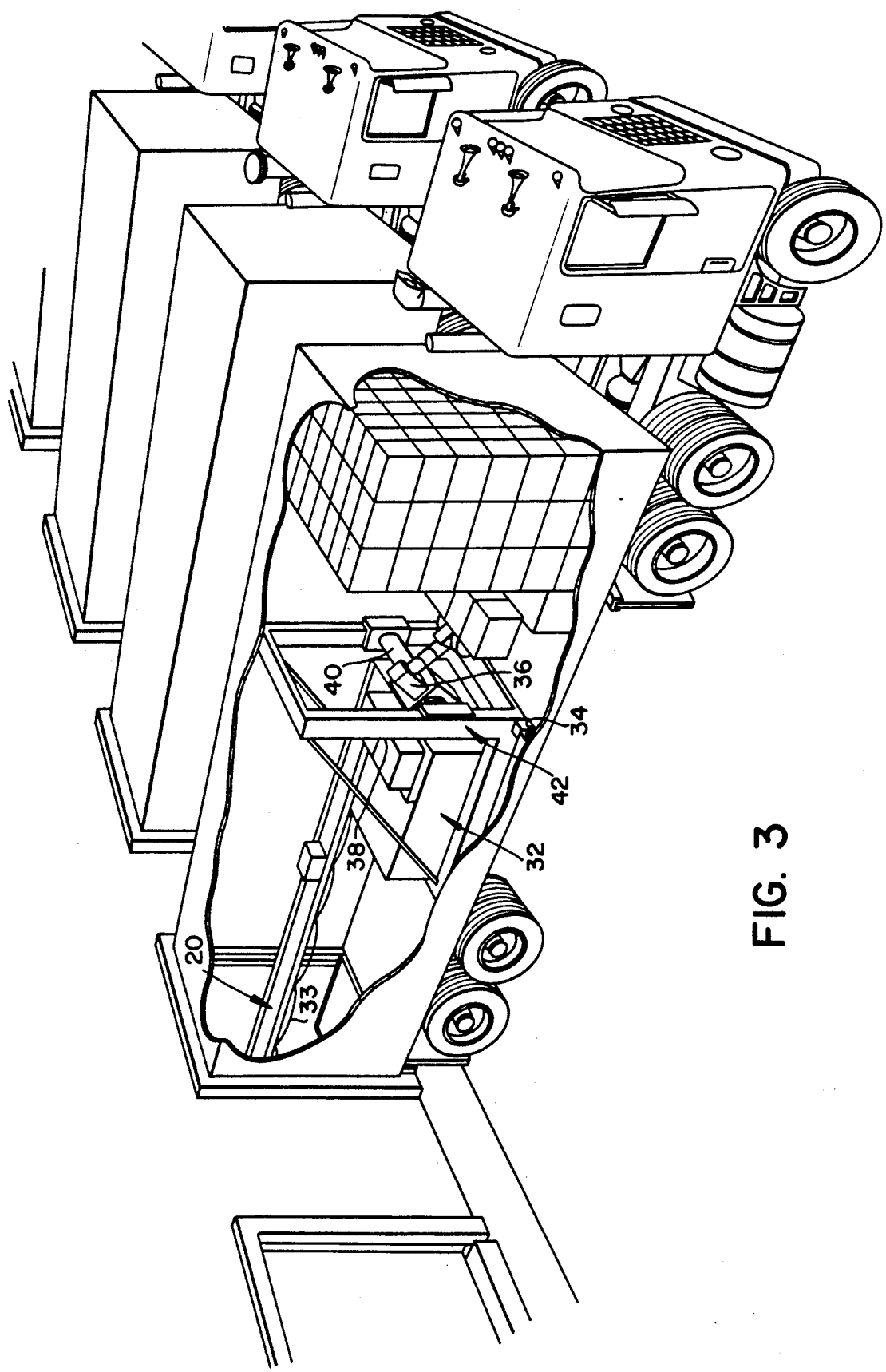
FIG. 3 illustrates a robot loader employed in the system shown in FIG. 1 positioned within a cargo compartment of a vehicle to be loaded.

The telescoping conveyor 20 delivers the containers to a robot loader 32 which is located within the vehicle to be loaded as shown in FIG. 3. The robot loader 32, which can be either wheeled or tracked, is self-propelled by an electric motor and withdraws from the vehicle as the containers are loaded. Power for the robot loader 32 may be provided either by batteries or via a retractable umbilical cord 33 that is attached to the telescoping conveyor 20. The umbilical cord 33 is also used to transmit command signals from a computer control unit, which will be described in greater detail below, to the robot loader 32.

Preferably, non-contact distance sensors 34, for example ultrasonic or infrared sensors, are provided on the four corners of the robot loader 32. The sensors 34 provide position signals to the computer control unit to insure that the computer control unit properly maintains the position of the robot loader 32 with respect to the vehicle, as the loader moves in and out of the cargo compartment. Alternatively, mechanical contact guide assemblies can be used in place of the non-contact distance sensors 34.

The robot loader 32 includes a telescopic robot arm 36 that picks up the containers received from the telescopic conveyor 20 at a receiving station 38 located on the robot loader 32 and places the containers in the vehicle. The receiving station 38 is fixed in the embodiment illustrated, but may optionally be designed to move in the vertical direction to further facilitate the loading operation. The robot arm 36 is mounted to a horizontal beam 40 so that it may rotate about and move horizontally along the beam 40. The beam 40 is in turn mounted to a vertical frame 42 that is mounted on the robot loader 32 so that the robot arm 36 can be moved vertically. A Scara robotic system may optionally be employed as part of the robot loader 32.

Figure 4:
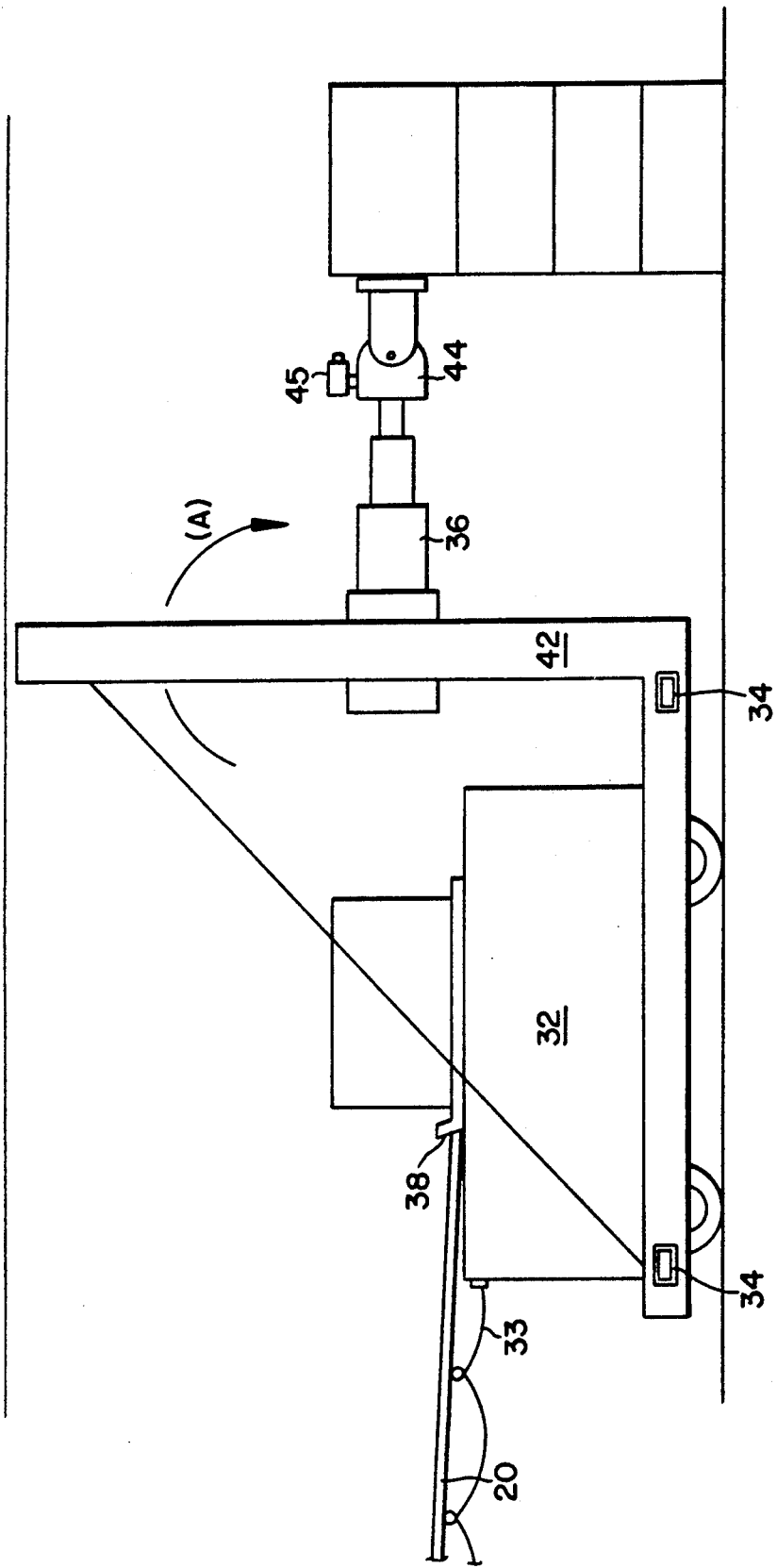
FIGS. 4 and 5 illustrate the movements of a robot arm employed on the robot loader shown in FIG. 3.
Figure 5:
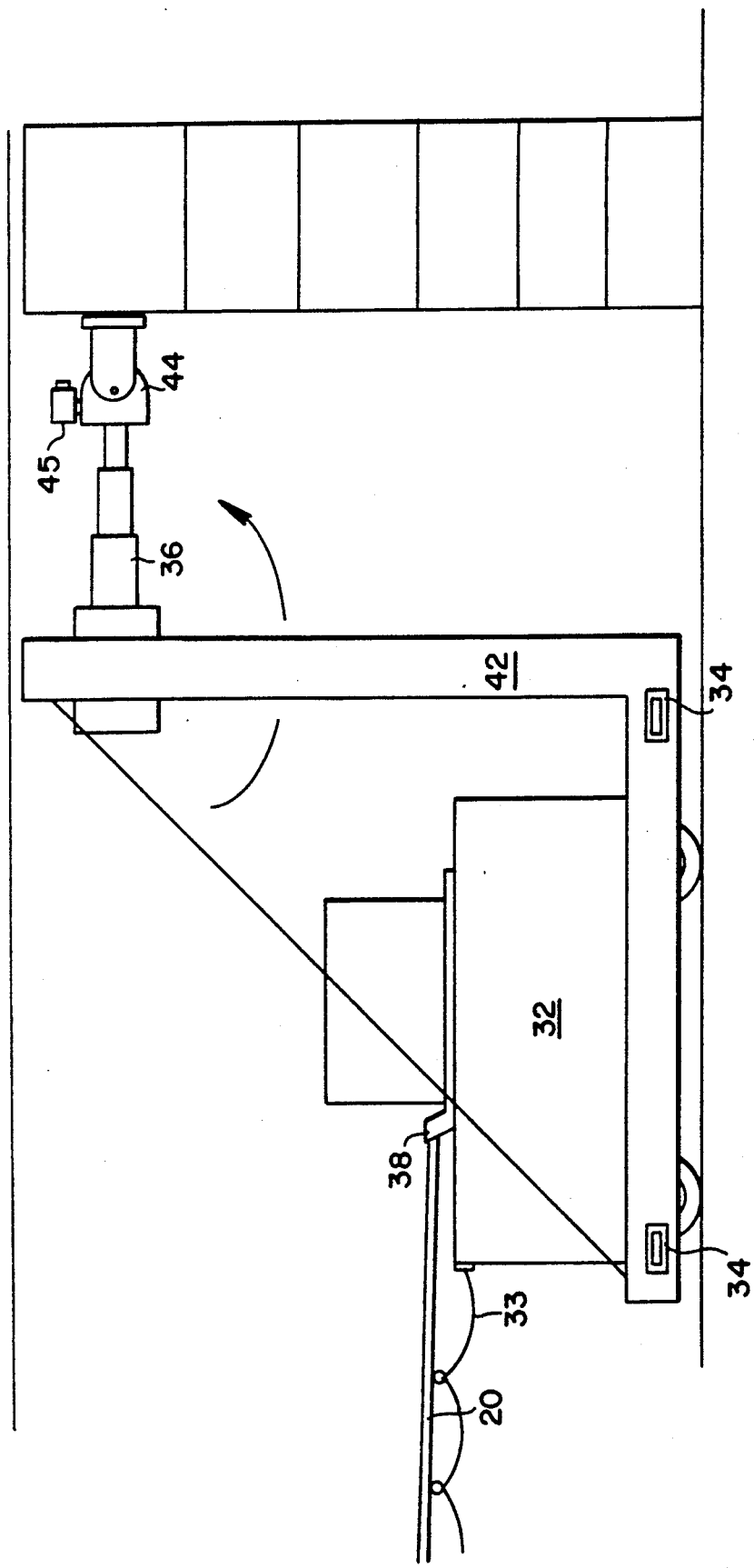

As shown in FIG. 4, the robot arm 36 includes a gripper unit 44 that is gimbal mounted to the arm 36 and preferably uses a vacuum grippers to pick up the containers, although other types of grippers may be readily employed. This mounting configuration in operation, permits the robot arm 36 to move along an arc (A) to reach back and pick up the containers with the gripper unit 44 in an "over the shoulder" type movement, which minimizes the amount of space required for the operation of the arm 36. The movement of the robot arm 36 switches to an "underhand" motion as shown in FIG. 5, when the height of the row being stacked would result in a container hitting the roof of the vehicle if the robot arm 36 executed the over the shoulder movement shown in FIG. 4. In other words, the robot arm 36 picks up a container from a first location at the receiving station 38 and rotates about a pivot point, such that the container is moved along an arc to a second storage location within the vehicle cargo compartment.

Figure 6:
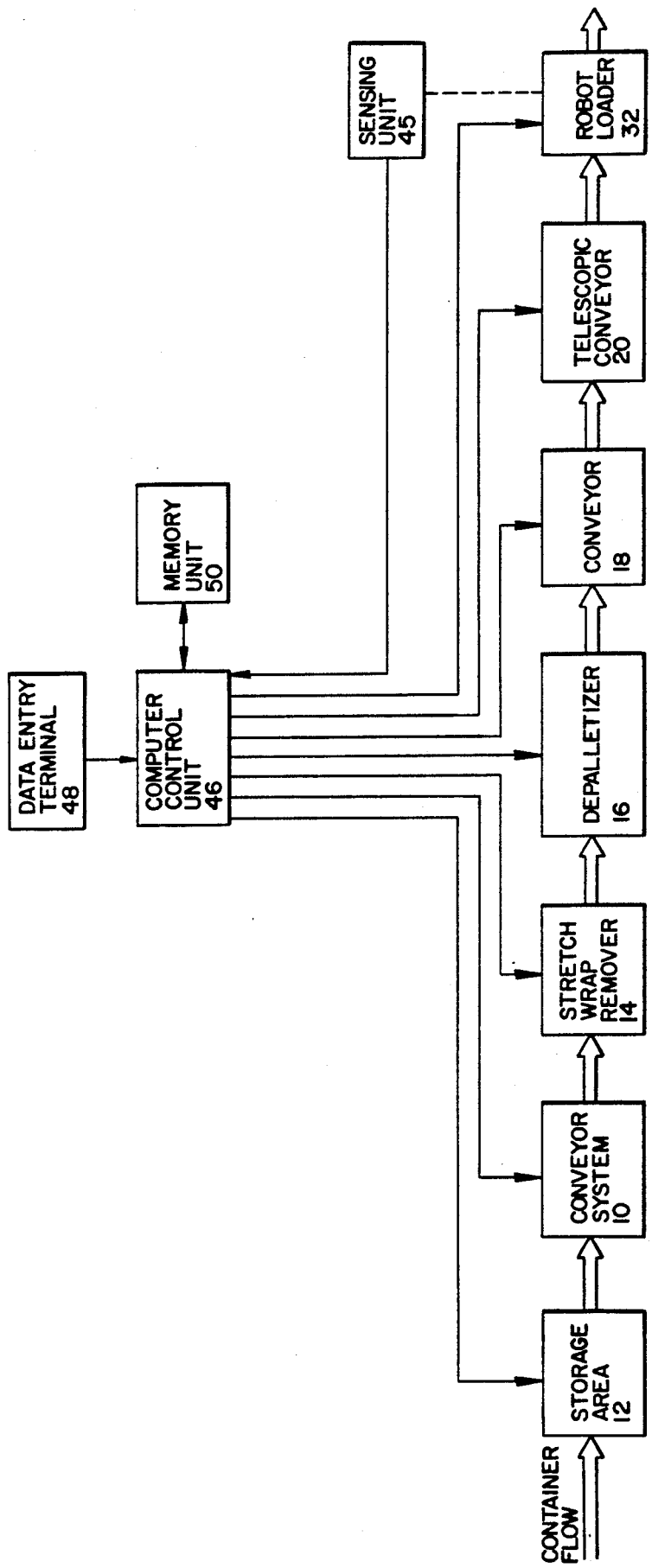
FIG. 6 is a block diagram of the control architecture for the system illustrated in FIG. 1.

A sensor unit 45 is also provided on the robot arm 36 to monitor the operation of the arm and insure the containers are being properly located. The output signals from the sensor unit 45 are provided to a computer control unit 46 shown in FIG. 6 that controls the operation of the robot loader 32. The sensor unit 45 may alternatively be located on the vertical frame 42 or any other convenient location on the robot loader 32 based on the type of sensing technique employed. Preferably, the sensor unit 45 includes a machine vision system including a video camera, illumination means and a vision processing unit, although other types of sensors and sensing techniques (for example ultrasonics) may be employed.

The computer control unit 46 also utilizes a software routine to determine the optimum load configuration for a given vehicle and load based on the dimensions of the vehicle and the containers to be loaded. Other factors such as weight distribution may also be taken into account by the computer control unit 46 in determining the optimum load configuration. Software systems are currently available which are capable of determining an optimum load configuration for a variety of different containers and can be readily adapted for use in the computer control unit 46. For example, U.S. application Ser. No. 331,621 filed Mar. 30, 1989, for "Object Placement Method and Apparatus" and assigned to the assignee of the present application, discloses a software system that determines optimum load configuration that may be employed in the computer control unit 46. Based on the optimum load configuration, the computer control unit 46 controls the operation of the overall system to deliver containers to the robot loader 32 in the order and orientation that most efficiently utilizes the available cargo space of the vehicle.

For example, an operator down loads information from a host computer identifying the type and number of containers to be loaded and manually inputs the type of vehicle being loaded via a data entry terminal 48 into the computer control unit 46. Based on the information provided by the operator, the computer control unit 46 retrieves container and vehicle parameter data (such as the dimensions of the various containers and the vehicle) which has previously been stored in a memory unit 50, and calculates an optimum load configuration. The control unit 46 then activates conveyor system 10 to retrieve pallets in the proper order based on the optimum load configuration from the storage area 12 and deliver the pallets to the stretch wrap removers 14. After the pallets have been unwrapped by the stretch wrap removers 14 and depalletized by the depalletizers 16, the conveyor system 18 is controlled by the computer control unit to deliver the containers to the telescoping conveyors 20. The depalletizers 16 are controlled to orient the containers properly before placing the containers on the conveyor system 18. Alternatively, a conventional turntable may be provided as part of the conveyor system 18 so that the computer control unit 46 can orient the containers to conform to the optimum load configuration before delivering the containers to the telescoping conveyors 20. A turntable could also be incorporated as part of the receiving station 38 located on the robot loader 32 to accomplish proper orientation of the containers. Once properly oriented and delivered to the robot loader 32, the computer control unit 46 directs the robot arm 36 to pick up the containers, either singly or a row at a time, and place them in the vehicle. Once a row has been completely filled in the vehicle, the computer control unit 46 directs the robot loader 32 to move back so the next row of containers can be loaded and the process repeated until the loading operation has been completed.

The robot loader 32 employed in the above-described system provides distinct advantages over conventional loading systems. As the vehicle is directly loaded, there is no need for intermediate preassembly of the load or for the use of sleds, pallets or skids. The entire volume and/or weight limits of the vehicle can therefore be efficiently utilized to carry cargo. In addition, the robot loader 32 can be used on any conventional vehicle without requiring modification of the vehicle.

The present invention has been described with reference to certain preferred embodiments thereof, but it will be understood that modifications and variations may be made within the spirit and scope of the invention. For example, different structural configurations may be employed for the robot arm 36 and the gripper unit 44, as well as for the other components of the system.

What is claimed is:

1. A robot loader apparatus comprising:
   a movable carriage;
   a receiving station on said movable carriage configured to receive containers to be manipulated; and
   a loader on said movable carriage, said loader comprising:
   spaced vertical support members;
   a beam defining a pivot axis between said support members, said beam being mounted for movement vertically along said support members; and
   a robot arm mounted on said beam to pick up said containers from said receiving station and load said containers into a cargo compartment, said robot arm being mounted for pivoting movement about said pivot axis between said vertical support members and translational movement vertically with said beam between said support members, such that said robot arm can pick up said containers from a first location at said receiving station and rotate about said pivot axis to carry said containers through an arc to a second location.

2. An apparatus as claimed in claim 1, wherein said robot arm is telescopic.

3. An apparatus as claimed in claim 1, wherein said robot arm is mounted on said self-propelled robot loader to provide three-dimensional movement of said robot arm.

4. An apparatus as claimed in claim 1, wherein said robot loader further includes non-contact distance sensor mounted on the sides of said robot loader.

* * * * *

UNITED STATES PATENT AND TRADEMARK OFFICE
CERTIFICATE OF CORRECTION

PATENT NO. : 5,015,145

DATED : May 14, 1991

INVENTOR(S) : Mickey A. Angell et al

It is certified that error appears in the above-identified patent and that said Letters Patent is hereby corrected as shown below:

Column 1, line 30, after "on" please insert --the--;

column 2, line 38, delete "a" (first occurrence) and insert --an--;

column 3, line 37, delete "a"; and column 4, line 59, delete "be" and insert --been--.

Signed and Sealed this

Twenty-second Day of December, 1992

*Attest:*

DOUGLAS B. COMER

*Attesting Officer*    *Acting Commissioner of Patents and Trademarks*